United States Patent [19]

Trommer et al.

[11] Patent Number: 5,257,541
[45] Date of Patent: Nov. 2, 1993

[54] PROCESS AND DEVICE FOR AUTOMATIC IDENTIFICATION OF INCREASED RESONANCE RESPONSE DURING BALANCING PROCEDURE

[75] Inventors: Wolfgang Trommer, Darmstadt; Karl-Heinz Schminke, Pfungstadt, both of Fed. Rep. of Germany

[73] Assignee: Carl Schenck AG, Fed. Rep. of Germany

[21] Appl. No.: 757,253

[22] Filed: Sep. 10, 1991

[30] Foreign Application Priority Data

Sep. 10, 1990 [DE] Fed. Rep. of Germany ....... 4028656

[51] Int. Cl.$^5$ ............................................. G01M 1/22
[52] U.S. Cl. ..................................................... 73/462
[58] Field of Search ........................... 73/462, 460, 660; 364/508; 340/683

[56] References Cited

U.S. PATENT DOCUMENTS 3,661,016  5/1972  Dopp ..................................... 73/462
4,750,361  6/1988  Bandhopadhyay ................... 73/462

FOREIGN PATENT DOCUMENTS 683481   10/1939  Fed. Rep. of Germany .
2727092  4/1979  Fed. Rep. of Germany .
3112188  1/1982  Fed. Rep. of Germany .
3039933  5/1982  Fed. Rep. of Germany .
3044440  6/1982  Fed. Rep. of Germany .
2459282  3/1988  Fed. Rep. of Germany .
273752A3 11/1989 Fed. Rep. of Germany .
3828611  3/1990  Fed. Rep. of Germany .
3907419  9/1990  Fed. Rep. of Germany .

OTHER PUBLICATIONS

Glienecke, J.; Wiedenmann, Konstruktion 30, H. 8, 1978, pp. 311-317.

Spath, W. Dr.: Industrie Rundschau, Jg. 14, 1959, pp. 20-23.
Teodorescu, Dan, Messen & Prufen/Automatik, Jan.-/Feb. 1980 pp. 51-55.
Technical Review, No. 3, 1979, pp. 3-26, J. F. G. Wort, "The Rationale of Dynamic Balancing by Vibration Measurement".
Harris, Cyril M.; Crede, Charles E.: Shock and Vibration Handbook: McGraw-Hill Book Company, 1976, Chapter 39 entitled "Balancing of Rotating Machinery" by D. Muster et al.
Technical Review No. 1, 1981, pp. 3-31, Narum, Denmark; J. F. G. Wort: "The Fundamentals of Industrial Balancing Machines and their Applications".
Soviet Inventions Illustrated Derwent Publications Ltd., London, GB; Section EL:Electrical, week E06, Class S, No. B3886; & SU-A 823921, Apr. 23, 1981.
Soviet Inventions Illustrated Derwent Publications Ltd., London, GB; Section EL:Electrical, week E17, Class S, No. E9676; SU-A 847104, Jul. 25, 1981.

Primary Examiner—John E. Chapman
Attorney, Agent, or Firm—Connolly & Hutz

[57] ABSTRACT

A process and device providing automatic identification of increased resonance response during a balancing procedure on permanently calibrated, hard-bearing balancing machines. Unbalance values are determined for each bearing plane of a rotor being balanced for at least three measuring speeds. At least two difference values of speed-related adjacent unbalance values are determined in an evaluation device. Increased resonance response is determined if the difference values between adjacent higher measuring speeds are proportionally greater than those between adjacent lower rotational speeds.

1 Claim, 1 Drawing Sheet

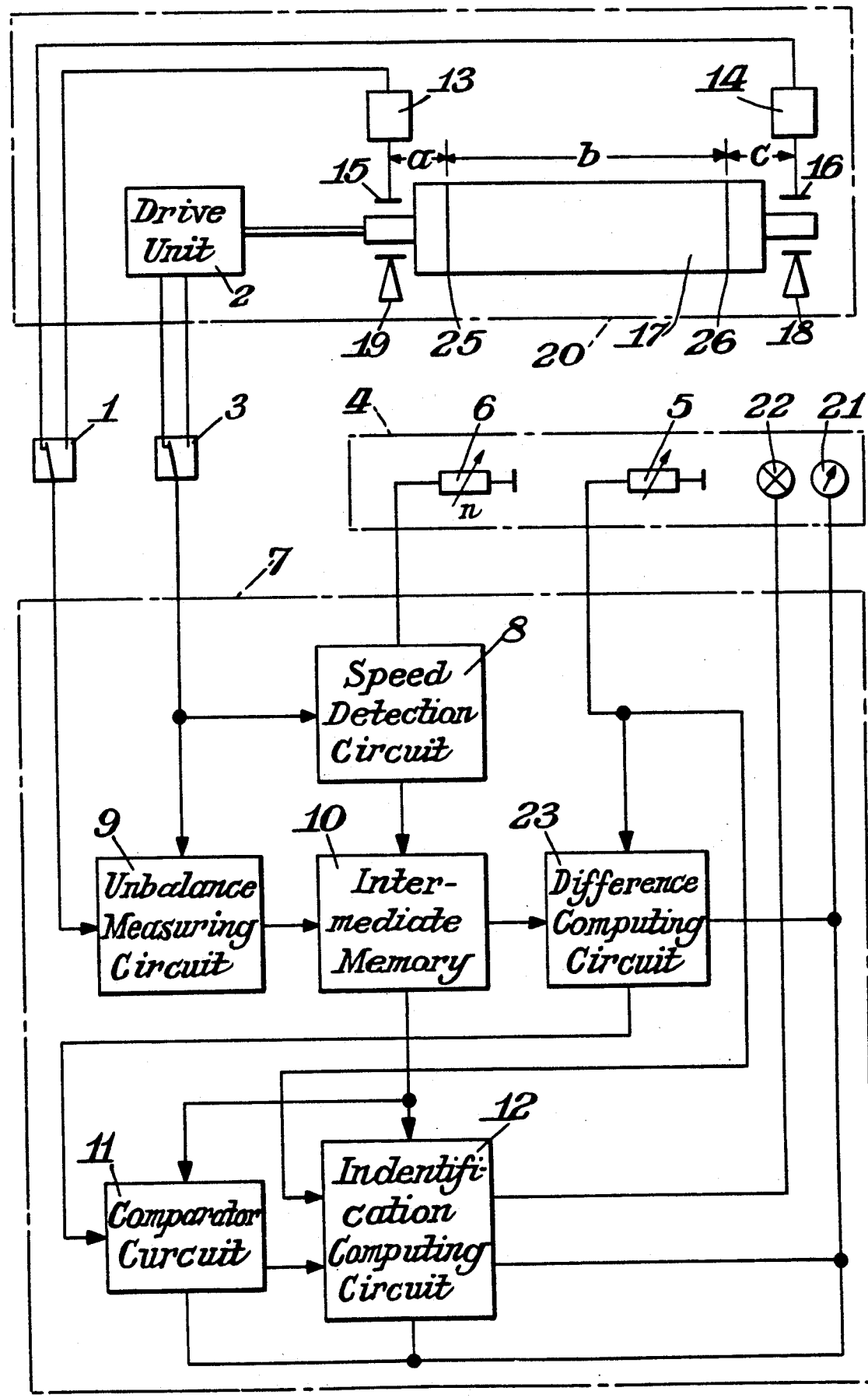

PROCESS AND DEVICE FOR AUTOMATIC IDENTIFICATION OF INCREASED RESONANCE RESPONSE DURING BALANCING PROCEDURE

BACKGROUND OF THE INVENTION

The present invention relates to a process and to a device for the automatic identification of increased resonance response during the balancing procedure on permanently calibrated, hard-bearing balancing machines.

Rotors to be balanced on balancing machines constitute a vibratory system consisting of various masses and different degrees of stiffness. For a precise determination of the unbalance values, permanently calibrated, hard-bearing balancing machines require that the unbalance values not be measured in vicinity of the resonance speeds, since this greatly increases the measuring errors. For this reason, the unbalance is usually measured in a rotational speed range which is approximately 30% of the first resonance speed. In this process, the resonance speed is largely determined by the magnitude of the rotor mass, the rotor moment of inertia, the masses of the bearings as well as the stiffness of the rotor and bearings of the system consisting of rotor and balancing machine.

Until now, the maximum permissible balancing speed for permanently calibrated, hard-bearing balancing machines was calculated by means of tables. For this purpose, the operator of the balancing machine could read the maximum permissible balancing speed for the rotor weight in question from a table provided by the manufacturer. In general, these tables containing the speed data only provided the maximum permissible balancing speeds which were valid for symmetrical rotors. Only one vibration mode was taken into consideration; namely, parallel displacement of a rigid rotor in flexible bearings. In the case of hard-bearing, permanently calibrated balancing machines, in addition to the above-mentioned mode, it is usually necessary to also take into consideration two other vibration modes whose appertaining resonance speeds can sometimes be below the resonance speed of the parallel displacement mode of the rotor. These two vibration modes presume the counter movement of a relatively rigid rotor in flexible bearings on the one hand, and the bending of a flexible rotor in relatively rigid bearing supports on the other hand.

Which resonance speed is the smallest for a certain rotor-bearing system depends on the rotor mass and on its moments of inertia, on the masses of the bearings and on the stiffness of the rotor and bearings. As a rule, the resonance speed of a vibration mode whose speed is the lowest determines the limit of the permanent calibraton and the plane separation based on the geometry of the rotor. In this case, the rules of the single-mass spring system should be employed as an approximation, since this is the mode that predominates.

For this reason, when taking into consideration only the vibration mode for the parallel displacement of a rigid rotor with relatively flexible bearings, it is sometimes the case that the maximum permissible balancing speeds—which have been ascertained from the tables for the rotor to be balanced—are selected excessively high, thus leading to increased resonance responses, which distort the measured results without the operator realizing it.

SUMMARY OF THE INVENTION

Therefore, the present invention is based on the objective of improving a process of the type mentioned above in such a manner that the device identifies when a resonance speed is approached too closely in permanently calibrated, hard-bearing balancing machines.

The invention entails the advantage that the maximum permissible balancing speeds are automatically checked during the balancing procedure and that the operator is informed accordingly if this speed is exceeded.

It is likewise advantageous, in a special embodiment of the process, to automatically carry out a correction of the pre-selected balancing speed.

BRIEF DESCRIPTION OF THE DRAWINGS

Novel features and advantages of the present invention in addition to those mentioned above will become apparent to those of ordinary skill in the art from a reading of the following detailed description in conjunction with the accompanying drawing wherein similar reference characters refer to similar parts and in which the single figure of drawing is a block diagram of a balancing machine with an evaluation device together with a display and input unit.

DETAILED DESCRIPTION OF THE INVENTION

Referring in more particularity to the drawing, a hard-bearing balancing machine 20 with a rotor 17 to be balanced is connected to an evaluation device 7, by means of which impermissible increases in resonance response can be identified during balancing and shown in a display and input unit 4. The balancing machine 20 consists in essence of two bearing pedestals 18, 19 which serve to support the rotor 17 to be balanced. For each bearing plane 15, 16, there is a transducer 13, 14 installed in the bearing pedestals 18, 19. Both transducers 13, 14 are electrically connected to an unbalance measuring circuit 9 in the evaluation device 7 via a shared first channel switch 1. The rotor 17 supported in the balancing machine 20 is coupled to a drive unit 2 which generates a rotationally-synchronous reference signal. The reference generator of the drive unit 2 is also connected to the unbalance measuring circuit 9 in the evaluation device 7 via a second channel switch 3.

The measuring signals generated by the two transducers 13, 14 are frequency-selected and amplified in the unbalance measuring circuit 9 in the evaluation device 7. Furthermore, the measured signals are double integrated in the unbalance measuring circuit 9 so that a signal can be obtained which is theoretically independent of the rotational speed. As the output signal, the rotationally synchronous unbalance measuring signal also contains, in addition to the unbalance components, the measuring errors caused by increased resonance response at higher balancing speeds.

The measuring errors occur primarily due to the fact that the unbalance value is calculated on the basis of an equation which assumes that the measured signal is proportional to the centrifugal force. However, since resonance phenomena occur with permanently calibrated, hard-bearing balancing machines at high speeds, these phenomena also must be taken into consideration. The invention makes use of the fact that impermissibly high resonance response can be determined in that, in the case of impermissibly high speed ranges, the idealized values at which the measured signal is proportional to the centrifugal force differ from the unbalance values which can be actually ascertained. In fact, an increased resonance response always exists whenever the deviation becomes greater as the balancing speed increases. On the basis of this regularity, the evaluation device must pick up and store at least three unbalance signals obtained at various measuring speeds for each bearing plane. On this basis, the differences are then generated and compared to each other.

In order to do this, the evaluation device 7 also contains a speed-detection circuit 8 to which the reference signals are transmitted. Since these reference signals contain rotor-synchronous components, each momentary speed of the rotor is continuously calculated for pre-defined time cycles by means of the speed-detection circuit 8. The speed-detection circuit is simultaneously connected to a display and input unit 4, which can be used to pre-define various rotational speeds of the rotor for the speed-detection circuit. For this purpose, the display and input unit 4 has a speed-setting mechanism 6 with which the various rotor speeds can be manually selected. The speed-detection circuit 8 continuously compares the pre-selected rotor speeds with the momentary rotor speeds and, for each correspondence with the pre-selected rotational speeds, generates a detection signal by means of which the corresponding unbalance signal is transmitted to an intermediate memory 10 of the evaluation device 7.

The intermediate memory 10 is also connected with the unbalance measuring circuit 9, which continously sends the output signals of the unbalance measuring circuit 9 to the intermediate memory 10. In this manner, for each rotor speed entered, the corresponding unbalance signals are stored. In this context, the memory records the unbalance values separately for each bearing plane 15, 16. The evaluation device 7 is designed in such a way that the intermediate storing of the unbalance signals is already done during the acceleration of the rotor to its target speed.

However, it is also possible for the pre-selected balancing speeds to be established separately by the operating personnel. The pre-selected balancing speeds are always based on the highest balancing speed desired, which coresponds to the target speed of the rotor during the balancing procedure. The target speed is a machine-dependent and rotor-dependent speed which ideally maintains a distance from the first resonance speed amounting to at least 70%. Since this target speed is usually ascertained on the basis of the first vibration mode—whereby, however, other modes or combinations thereof can also be present in actual practice - it is also possible that an appreciable increase in resonance response is present even at lower rotational speeds. In the case of permanently calibrated, hard-bearing balancing machines, however, the actual resonance speed cannot be calculated under actual operating conditions, so that for the defined target speed, an appreciable increase in resonance response can already be present, which distorts the measured results.

In order to determine that there is an impermissibly high resonance response, at least three unbalance signals are picked up and stored while the rotor is being accelerated. In addition to storage of the unbalance signal for the target balancing speed, these are measured values which were obtained at speeds markedly below the target balancing speed. These speeds should be substantially lower than the target balancing speed, but the lowest speed is selected high so that the phenomena of constraining forces are kept as small as possible. Measuring speeds which amount to 60% and 80% of the target speed have proven to be advantageous.

The unbalance values stored by the intermediate memory 10 for each correction plane 25, 26 are now available to a difference computing circuit 23 via connection lines. On the basis of the three unbalance values, the difference computing circuit 23 then generates the vectorial difference for each bearing plane 15, 16 from the two adjacent unbalance values. Since only large differences in measured values can lead to a significant distortion of the unbalance results, a tolerance comparison is already carried out in the difference computing circuit 23. For this purpose, the difference computing circuit 23 is also connected to a setting element 5 in the display and input unit 4, by means of which an unbalance tolerance range is manually specified. The unbalance tolerance range could also be permanently set or else it can be retrieved from a data carrier.

All of the differences in measured values of each bearing plane 15, 16 are compared in the difference computing circuit 23 with the pre-defined tolerance values. If the differences in measuring values remain within a portion of the pre-defined tolerance range, the unbalance value at the target speed is displayed in the regular way. For this purpose, the difference computing circuit 23 is connected to the display device 21 in the input and display unit 4. In the case of the above-mentioned tolerance comparison, the pre-defined tolerance range is selected by a certain value smaller than the permissible final tolerance range, for example, according to ISO 1940, in order to also take into consideration the other measuring inaccuracies. Moreover, in this comparison, the absolute tolerance value is extrapolated to a relative tolerance range, namely, in the ratio of the measured value for the target speed $n_S$ to the absolute tolerance itself. For this purpose, a signal is generated in the difference computing circuit by means of which the unbalance value at the target speed is switched through from the intermediate memory 10 to the display device 21.

If, on the other hand, the comparison in the difference computing circuit 23 shows a deviation which exceeds this pre-defined, relative tolerance range, and if the actually measured value for the target speed lies outside of the absolute tolerance range, then all of the differences in measured values are transmitted to a comparator circuit 11. If the actual measured value for the target speed lies within the tolerance range, then the measured value is displayed in the regular way.

Furthermore, this comparator circuit 11 is also connected to the intermediate memory 10, so that the rotational speeds as well as the individual unbalance values of each bearing plane 15, 16 are available to the comparator circuit 11. The two differences in measured value of each bearing plane are compared to each other in the comparison computing circuit 11. If the comparison for each bearing plane shows that the differences in measured values between the two higher speeds are greater than between the lower speeds, then it is usually the case that the results of the measurement have been distorted by an increased resonance response. If the difference value comparison for each bearing plane shows that both difference values between the higher measuring speeds are greater than between the lower measuring speeds, an angle-comparison calculation is subsequently carried out.

However, on the basis of the above-mentioned difference comparison calculation, it would already be possible to ascertain with sufficient accuracy that there is a distortion of the measured results due to increased resonance response. Once this difference value deviation has been detected, a detection signal is then generated, which serves to acoustically and/or visually display the existence of an increased resonance response.

To improve the measuring accuracy, an angle-comparison calculation is additionally carried out in the comparator circuit 11 for each bearing plane. For this purpose, for each bearing plane, the angles of the two adjacent unbalance values, related to the angle of the adjacent unbalance value, are compared to each other. If the compared angles between the adjacent unbalance values neither proportionally increase nor decrease as the measuring speed increases, or if they remain different, then there is no increased resonance response, so that the unbalance value at the target speed is switched through from the intermediate memory 10 to the display device 21.

If, on the other hand, the above-mentioned comparison calculation shows that the angles of each bearing plane either proportionally increase or decrease when related to the reference point, or else remain the same as the measuring speed increases, then an impermissibly high resonance response is present, so that the comparator circuit 11 then generates a detection signal. The detection signal serves to indicate an impermissibly high resonance response as well as to initiate an identification calculation. The signaling takes place in a signal mechanism 22 in the display and input unit 4, and it can be acoustic and/or visual As a result, the operator of such a balancing machine is told to lower the selected target speed and to repeat the balancing procedure.

In another embodiment, the evaluation device can also be designed in such a way that, by means of additional calculation procedures, the identification accuracy of increased resonance responses during unbalance measurements is increased. For this purpose, the measured values obtained are mathematically checked by means of a given equation. If this shows that all of the measured values approximately match the values resulting from the equation, then one can be almost completely certain that an impermissibly high resonance response is present.

For this reason, the evaluation device contains an additional computing circuit, which calculates the two unknown parameters $(u \cdot r)_i$ and $\omega_{oi}$ from the obtained measured values $M_1$ and $M_s$ on the basis of the following function equation:

$$x_k = \Sigma \frac{(u \cdot r)_i}{c} \cdot \omega_k^2 \cdot \frac{1}{1 - (\omega_k/\omega_{oi})^2}$$

Key to the symbols:
x = measuring signal
u = unbalance mass
r = radius of the unalance to the shaft axis
c = supporting stiffness of the rotor
$\omega_k$ = angular velocity of the measuring speed in question
$\omega_o$ = modal angular velocity of the rotor and balancing machine
k = number of all of the measured values ascertained
i = number of vibration modes
When only one vibration mode is taken into consideration, two measured values are sufficient to determine the unknown factors, whereas four measured values are needed for two vibration modes, and six measured values in the case of three vibration modes. Since the measured values are always afflicted by certain errors, it is also possible to use more than just the minimum number of measured values, thus increasing the accuracy by means of a compensation calculation.

In the evaluation circuit, by means of the above equation, an unbalance value can be calculated for each speed that would result if an impermissible resonance response were present. Thus, the evaluation device can be designed for certain applications in such a manner that it compares the measured difference values with the calculated difference values at the appertaining speed and, in the case of a sufficient correspondence, it signals the presence of an impermissibly high resonance response. If there is a sufficient number of unbalance values, each resonance speed associated with each vibration mode can be calculated, and the maximum balancing speed can be determined on the basis of the lowest resonance speed.

Furthermore, the evaluation device can also be designed in such a way that an automatic signaling takes place when the maximum permissible speed is exceeded.

In another embodiment, the detection signal could be transmitted to a drive-control circuit which then lowers the target balancing speed by a certain amount. For this purpose, the drive of the balancing machine would have to be turned down briefly in order to repeat the measuring procedure at lower measuring speeds. If an appreciable resonance response were no longer present at this lower target speed, then the unbalance value at the target speed should be taken as the final value. If, on the other hand, an appreciable resonance response were to still be present, this procedure could be automatically repeated until the resonance response had become negligible.

In the present embodiment, the detection signal is also transmitted to an identification circuit. This identification circuit 12 ascertains which vibration modes have led to the impermissibly high resonance response In other words, whether this was primarily caused by the flexibility of the rotor or of the supports As a result, the operator is informed as to whether the impermissibly high resonance response was caused by the rotor itself or by the support in the balancing machine in question The values for the actual rotor mass G, the distance s of the center of gravity of the rotor from the right rotor bearing (when the center of gravity is to the right of the bearing) and the distance L of the bearings from each other are entered into the identification computing circuit 12. These values can also be automatically transmitted to the evaluation device in that the rotor mass can be ascertained by means of load cells located underneath the bearings. It is likewise possible to calculate the center of gravity of the rotor on the basis of the weight determined in the bearings and of the distance of the two bearings from each other. Moreover, the bearing distance could be automatically picked up by means of an electric measuring device or else it is possible to enter it permanently in the case of fixed bearing distances.

On the basis of the rotor and machine data entered, the identification computing circuit 12 calculates the equivalent mass GE by means of the following approximation formula:

$G_E = G[(1+2 \cdot S/L)^2 + 1]$.

In another calculation step, the identification computing circuit 12 then calculates the machine parameter $G_E \cdot n_s^2$. This value is then compared to a machine-related, pre-defined $Gn^2$ value. If this shows that the $Gn^2$ value is the same as or greater than the calculated $G_E \cdot n_s^2$ value, this is signaled in the display. On this basis, the operator of the balancing machine can conclude that the impermissibly high resonance response is primarily due to rotor flexibility which is not negligible.

In addition, the identification computing circuit can be used to simultaneously check whether the operator does not exceed the permissible $Gn^2$ value of the balancing machine in question when selecting the target balancing speed. This is achieved in that, by either pre-defining or by automatically detecting the actual rotor mass, the distance of the center of gravity of the rotor from one of the bearings as well as from the bearing distance, the equivalent mass $G_E$ can be calculated in the identification computing circuit 12 according to the approximation formula above. On this basis, the maximum permissible target speed $n_s$ can be calculated in another computing circuit. Then a comparator circuit could be used to compare this with the target balancing speed entered and, if this value has been exceeded, a signal could be generated or else the target balancing speed could be automatically lowered to the maximum permissible target speed calculated by the computing circuit.

What is claimed is:

1. A process for automatic identification of increased resonance response during a balancing procedure on permanently calibrated, hard-bearing balancing machines comprising the steps of determining unbalance values for each bearing plane of a rotor being balanced for at least three measuring speeds, generating at least two difference values of speed-related adjacent unbalance values in an evaluation device, determining an increase in resonance response if the difference values between adjacent higher speeds are proportionately greater than those between adjacent lower speed, and displaying measured values of unbalance when increased resonance response is not found.

* * * * *